UNITED STATES PATENT OFFICE.

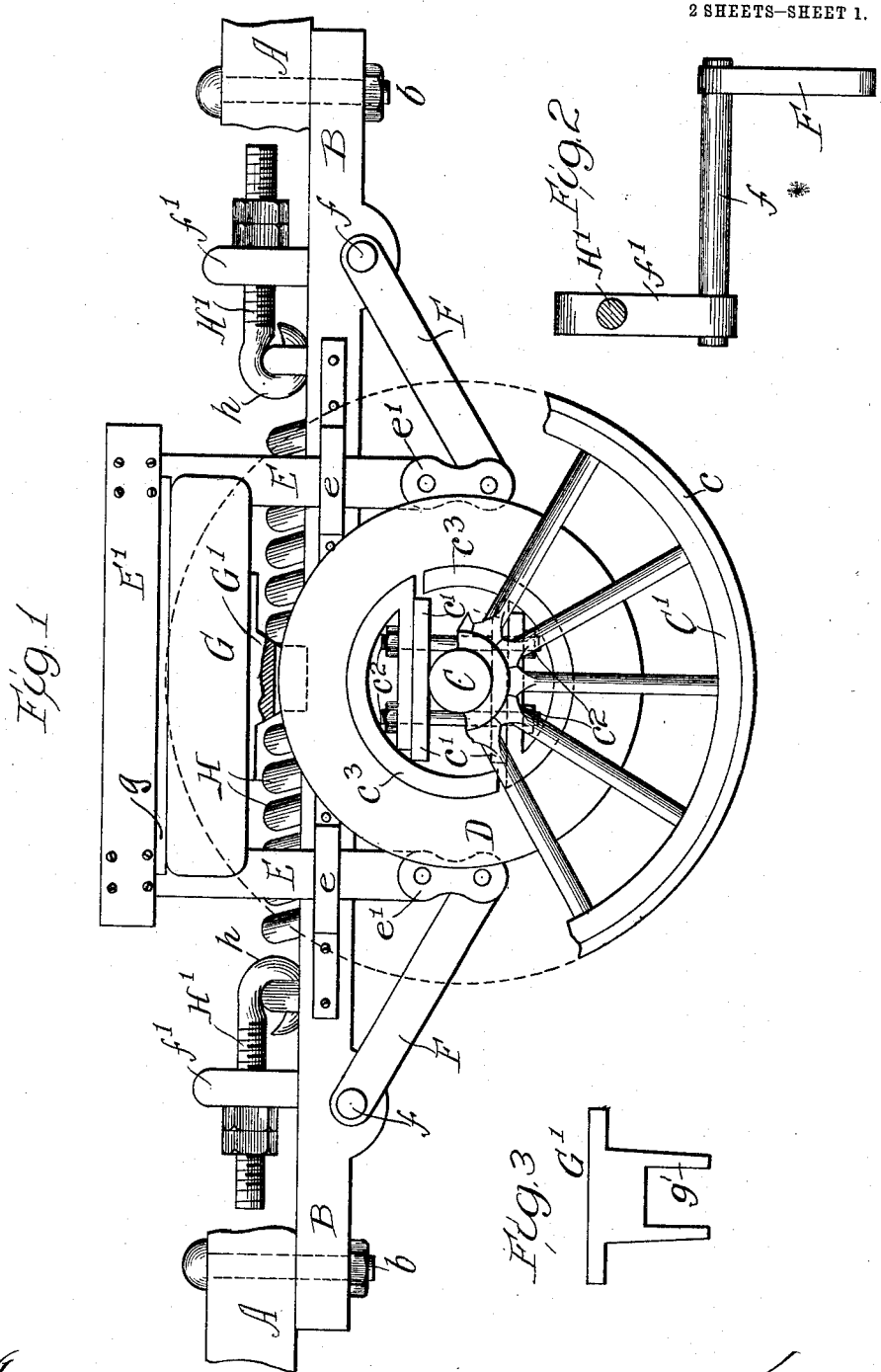

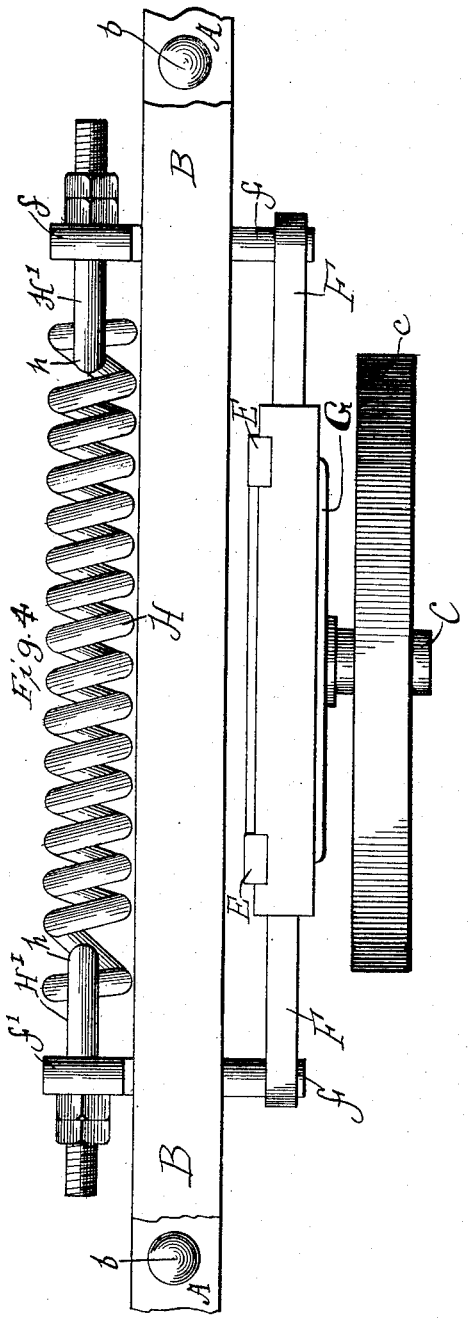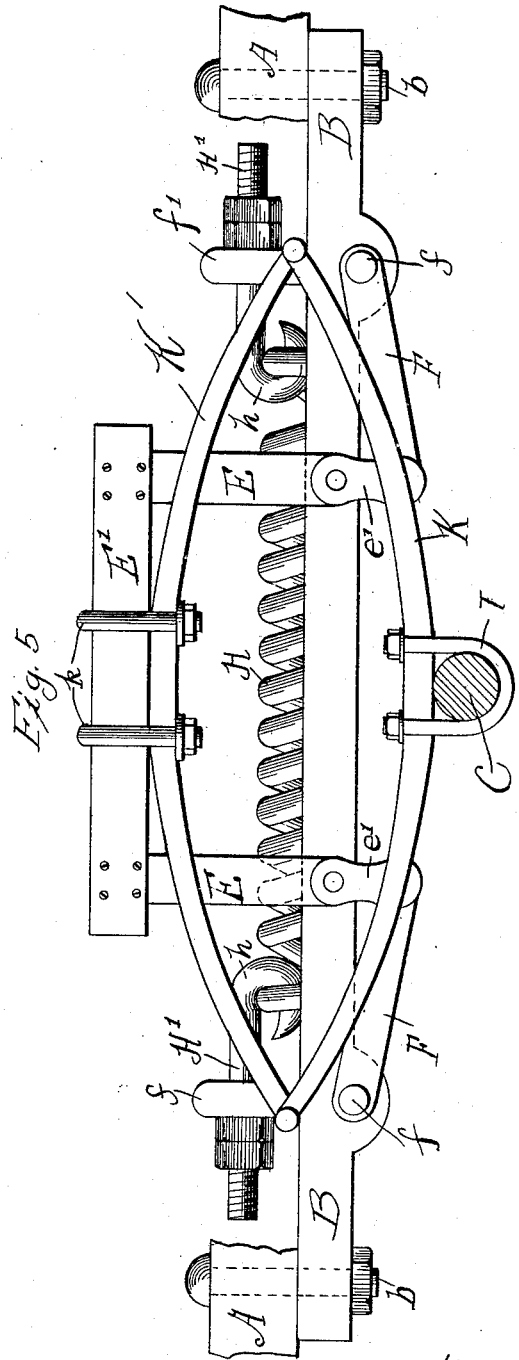

JOSEPH B. BURROUGHS, OF OBERLIN, OHIO.

SHOCK-ABSORBER FOR VEHICLES.

1,007,917. Specification of Letters Patent. Patented Nov. 7, 1911.

Application filed August 16, 1910. Serial No. 577,400.

*To all whom it may concern:*

Be it known that I, JOSEPH B. BURROUGHS, a citizen of the United States, residing at Oberlin, Lorain county, Ohio, have invented certain new and useful Improvements in Shock-Absorbers for Vehicles, of which the following, taken in connection with the drawing, is a description.

My invention has for its object the production of a shock absorber designed to be used on vehicles, more especially on automobiles and other motor vehicles which have heretofore used pneumatic tires.

A further object of my invention is to so construct this mechanism that it will be possible to do away entirely with the pneumatic tires as now used, by positioning the pneumatic tire entirely above and out of contact with the ground so that there will be no wear whatever on the tread of the tire, thereby making it possible to make one complete set of pneumatic tires last as long as the frame or any of the other parts of the vehicle, and at the same time the shocks and jars incident to traveling on a rough road will be so absorbed and distributed that the vehicle will at all times "ride easy."

A further object of my invention is to provide a pneumatic tire or pneumatic cushioning means which shall be mounted upon the same shaft or axle with the wheels, and being of smaller diameter than the wheels of the vehicle, it does not at any time come in contact with the ground, nor does it necessarily have to revolve with the axle. With this construction the pneumatic tires, or other cushions absorb every shock the same as when placed on the rim of the wheel, but being at all times out of contact with the roadbed are not liable to be punctured or otherwise damaged by objects lying in the roadway. By this means a solid tire may be used on the wheels, thereby greatly lessening the expense of maintenance of the vehicle, as well as lessening the number of accidents to vehicles of this class on the road.

I also contemplate by my improved construction the arrangement of other elastic devices embodying cushioning springs which may take the place entirely of the pneumatic tires either on the wheels, or as a cushioning means above the wheels.

In the accompanying drawings I have illustrated what I now consider the preferred form of my construction, although it is obvious that the details thereof might be changed without departing from the spirit of my invention, and in these drawings Figure 1 illustrates a side elevation of an automobile wheel, partly broken away with my improved shock absorber applied to the axle, and connected to the frame of the chassis; Fig. 2 is a detail of the levers and fulcrum pin; Fig. 3 is an end view of the buffer; Fig. 4 is a top plan view of the construction shown in Fig. 1; and Fig. 5 is a modified form of construction illustrating the use of elliptic springs instead of pneumatic cushions.

The drawings illustrating my invention show it applied to one axle and in connection with one only of the wheels of the vehicle, and as its application to each of the wheels of the vehicle is the same, a description of one will suffice for all.

The body of the vehicle with which this construction is designed to be used may be any of the different types as now manufactured, said vehicle body forming no part of my invention. I have not illustrated the same in connection with my shock absorbing mechanism.

Referring to Fig. 1, A, A, represents a part of the chassis frame, which is broken away to illustrate the mechanism hereinafter explained, and upon which frame the body of the vehicle is mounted. Bearing boxes B, B, are secured by bolts $b$, $b$, or otherwise to the frame A, A. C is the axle upon which the wheel C' is mounted. The wheels of the vehicle are provided with pneumatic or cushion tires $c$. Mounted upon the axle C, or upon a loose sleeve which is mounted upon the axle, is a superterranean pneumatic receiving wheel or other elastic mechanism which is capable of receiving and transmitting any of the shocks and jars caused by a rough road or obstructions of any kind against which the vehicle comes in contact. In the form shown in Fig. 1, I have provided a frame which is preferably formed of two pieces $c'$, $c'$ to which are secured by the bolts $c^2$, $c^2$, or otherwise, the two piece circular rim $c^3$, $c^3$. Mounted upon this rim, and either partially or entirely surrounding the same, is a pneumatic cushion or tire D. This pneumatic cushion with the frames $c^3$, $c^3$ may or may not be made to revolve with the wheel C'. Resting upon the tire or cushion D is a buffer G', which is preferably although not necessarily made of rubber. This buffer has a recess g' upon the under side thereof which takes over the pneumatic tire or cushion D. and forms a guide, which prevents the tire or cushion from being jarred out of place. Above the buffer G' is a pneumatic cushion G, which has resting upon it a bolster E', having an engaging rim g securing together the cushion G and the bolster E'. Extending downwardly from the two ends of the bolster are the hanging bars E, E, which pass through guides e, e secured to the bearing boxes B, B, or to the chasses A, A. Movably secured to the lower end of the hanging bars E E, are the links e', e'. Levers F, F, are connected to the links e', e' and to a fulcrum pin f, f, which extends through the bearing box B, B, and connects the short arms of the levers f', f'. The fulcrum pins f, f, are keyed tightly to the two arms of the levers F, f' for a purpose hereinafter described. Extending parallel with the frame of the chassis is a coiled compression spring H, which is engaged at each end thereof by the hooks h, h, which extend from the pull rods H', H' which are in turn supported in the end of the short arm of the lever f'.

In Fig. 5 I have shown a modified form of cushioning means, which construction may be applied to the axle in place of the wheel with the pneumatic tire or cushion illustrated in Fig. 1. In this construction I employ elliptic springs which are mounted upon the axles of the vehicle. These may be double, triple or quintuple springs as desired, depending upon the service in which the vehicle is used. A frame l, is secured either to the axle C or to a sleeve loose on the axle, and extends through or is otherwise engaged to the lower ellipse K of the spring. The upper ellipse K' of the spring is secured to the bolster E' in any desired manner.

The operation of the device is as follows: When the wheel strikes an obstruction and is jarred, the axle C with the superterranean shock receiving mechanism is automatically jarred upwardly. The weight of the automobile through the frame thereof rests upon the shock absorber and has the effect when jarred to press downwardly on the top of the elastic mechanism heretofore described.

In the construction shown in Fig. 1 that much of the shock which is not absorbed by the cushion D continues upwardly through the buffer G', pressing against the rubber or pneumatic cushion G. This raises the bolster E' which pulls upon the rods E, E, and operates the long arms of the levers F, F. The fulcrum pins f, f, being keyed to the levers F, F, f, f, the short arms are simultaneously moved by the operation just described, which transmits the shock or jar to the compression spring H.

The operation of the construction shown in Fig. 5 is practically the same as that just described, the elliptic springs absorbing the shock from the axle the same as the pneumatic cushioning means just described and transmitting it to the bolster E', the resultant shock passing thence through the connecting lever mechanism to the horizontal spring H.

Thus it will be seen that the shock or jar occasioned by rough roads or obstructions will be distributed through the mechanism above described, and the effect upon the vehicle itself will be the same as though the cushioning means were on the rims of the wheels where they are liable to be damaged by puncturing and otherwise, and rapidly wear out; whereas by the use of this construction the pneumatic tire may either be eliminated entirely, or placed where the wear upon it is so slight that it will last as long as any of the other parts of the machine.

I claim:—

1. In a wheeled vehicle, a shock absorber comprising auxiliary wheels mounted upon the axles of the vehicle in proximity to the vehicle wheels and being of smaller diameter than the vehicle wheels a pneumatic cushion mounted upon and coacting with each of said auxiliary wheels, and bolsters above the pneumatic cushions extending at right angles to the axles of the vehicle, substantially as described.

2. In a wheeled vehicle, the combination of the chassis, axles and wheels thereof, with an auxiliary wheel mounted in proximity to each of the wheels of the vehicle, a buffer and pneumatic cushion mounted above and coacting with each auxiliary wheel, a bolster above each auxiliary wheel, a spring extending parallel with each bolster, and levers connecting the ends of the bolsters with the ends of the springs whereby the resultant jar is transmitted to the springs, substantially as described.

3. In a wheeled vehicle, the combination of the chassis, axles and wheels thereof with an auxiliary wheel mounted on a non revoluble sleeve surrounding each axle and in proximity to each of the vehicle wheels, a buffer and pneumatic cushion above each auxiliary wheel through which the shock is first transmitted vertically, a bolster a longitudinally extending compression spring coacting with each auxiliary wheel, and levers connecting said bolster and spring through which the resultant shock is transmitted to said spring, substantially as described.

4. In a wheeled vehicle, the combination of the chassis, axles and wheels thereof, with a pneumatic tired superterranean wheel mounted upon the same axle and in proximity to each of the vehicle wheels, a pneumatic cushion above each superterranean wheel, a bolster extending at right angles to the axle, a spring extending parallel with the bolster, and levers mounted in the vehicle frame connecting the bolsters and springs whereby the resultant shock is transmitted horizontally, substantially as described.

5. In a wheeled vehicle, the combination of the chassis, axles and wheels thereof, with a superterranean cushioning wheel mounted upon the same axle with the vehicle wheels, bolsters extending parallel with the chassis, horizontally disposed springs, levers mounted in the chassis frame connecting said bolsters and springs whereby the resultant shock is transmitted from the vertically disposed cushioning mechanism to the horizontally disposed springs, substantially as described.

6. In a vehicle wheel, a shock absorber coacting with the wheels of the vehicle, said shock absorber comprising a superterranean cushioning wheel mounted upon the axles of the vehicle near each vehicle wheel, bolsters supporting the weight of the vehicle body, a buffer between each bolster and its cushioning wheel, horizontally disposed elastic members, and levers mounted in the vehicle frame connecting said members with the bolster, substantially as described.

7. In a wheeled vehicle, the combination of the chassis, axles and wheels thereof, with a superterranean wheel mounted upon the axles near each vehicle wheel, a buffer and pneumatic cushion mounted above each of the superterranean wheels, a bolster above each of said pneumatic cushions and extending parallel therewith, a horizontally extending spring, and levers connecting each end of the bolsters with each end of the spring, whereby each cushioning mechanism is operable independently of any other, substantially as described.

8. In a wheeled vehicle, a shock absorber comprising non revoluble superterranean cushioning members mounted upon the axles of the vehicle and operating vertically, a bolster above said cushioning members a horizontally disposed spring in proximity to each of said cushioning members, a hanger bar depending from each end of the bolster, and bell crank levers connecting said hanger bars and the spring, substantially as described.

9. In a wheeled vehicle, the combination of the chassis, axles and wheels of the vehicle, with nonrevoluble auxiliary wheels mounted upon each axle in proximity to the vehicle wheels, pneumatic cushioning mechanism above said auxiliary wheels, bolsters extending parallel with the chassis above said cushioning mechanism, a horizontally extending spring coacting with each cushioning mechanism, levers connecting said bolsters and springs whereby said cushioning and spring mechanisms are united in consecutive action, substantially as described.

In testimony whereof I have signed this specification in the presence of two subscribing witnesses.

JOSEPH B. BURROUGHS.

Witnesses:
JAY W. SEAVER,
H. D. PHILLIPS.

Copies of this patent may be obtained for five cents each, by addressing the "Commissioner of Patents, Washington, D. C."